Jan. 12, 1954

V. GENINI ET AL 2,666,172

ELECTRIC MOTOR FOLLOW-UP SYSTEM FOR THE
ADJUSTMENT OF LIQUID LEVELS

Filed Aug. 6, 1947

Inventors:
Marcel Larapie and
Victor Genini

Jan. 12, 1954  V. GENINI ET AL  2,666,172
ELECTRIC MOTOR FOLLOW-UP SYSTEM FOR THE
ADJUSTMENT OF LIQUID LEVELS
Filed Aug. 6, 1947  9 Sheets-Sheet 3

Jan. 12, 1954  V. GENINI ET AL  2,666,172
ELECTRIC MOTOR FOLLOW-UP SYSTEM FOR THE
ADJUSTMENT OF LIQUID LEVELS
Filed Aug. 6, 1947  9 Sheets-Sheet 5
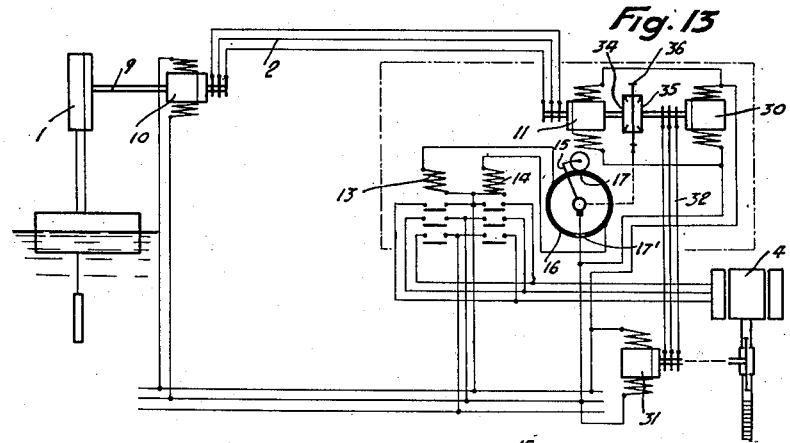
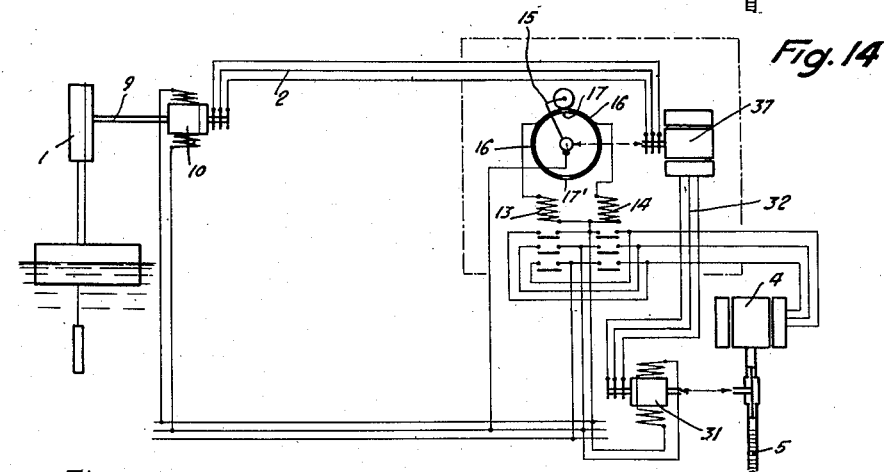
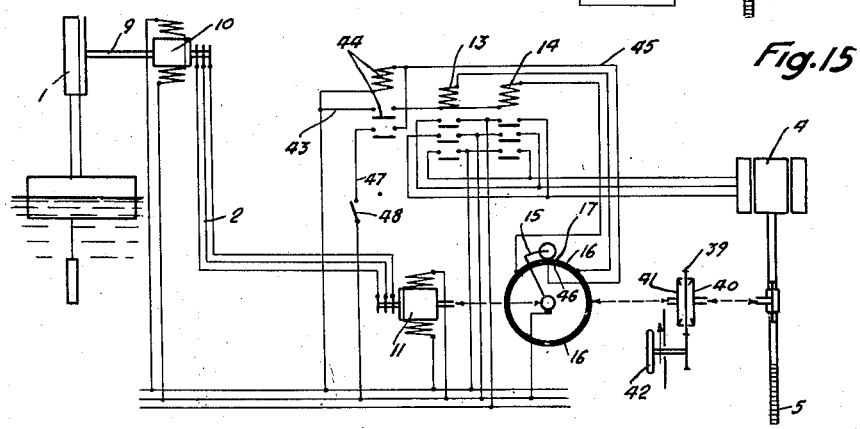

Jan. 12, 1954 V. GENINI ET AL 2,666,172
ELECTRIC MOTOR FOLLOW-UP SYSTEM FOR THE
ADJUSTMENT OF LIQUID LEVELS
Filed Aug. 6, 1947 9 Sheets-Sheet 6

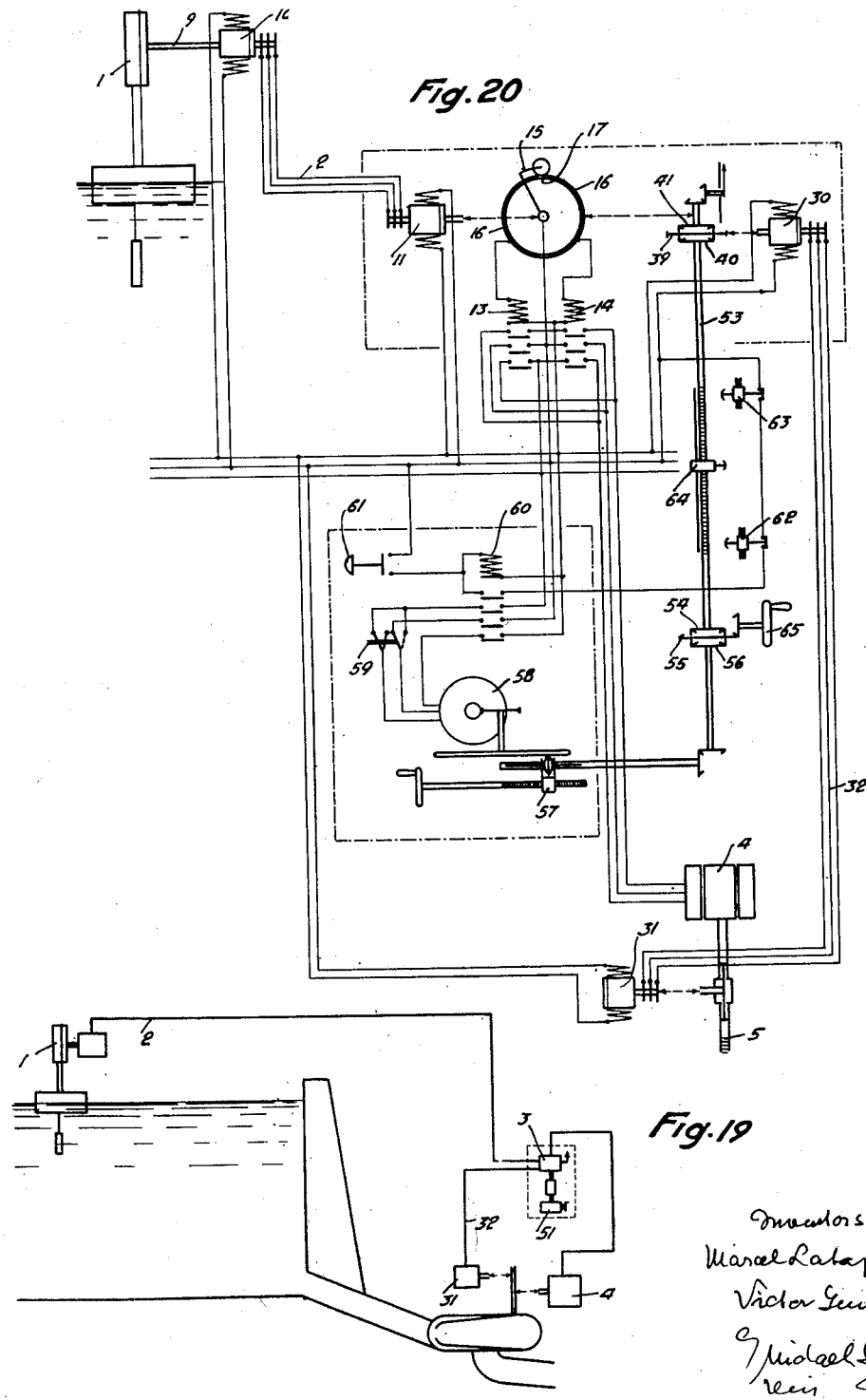

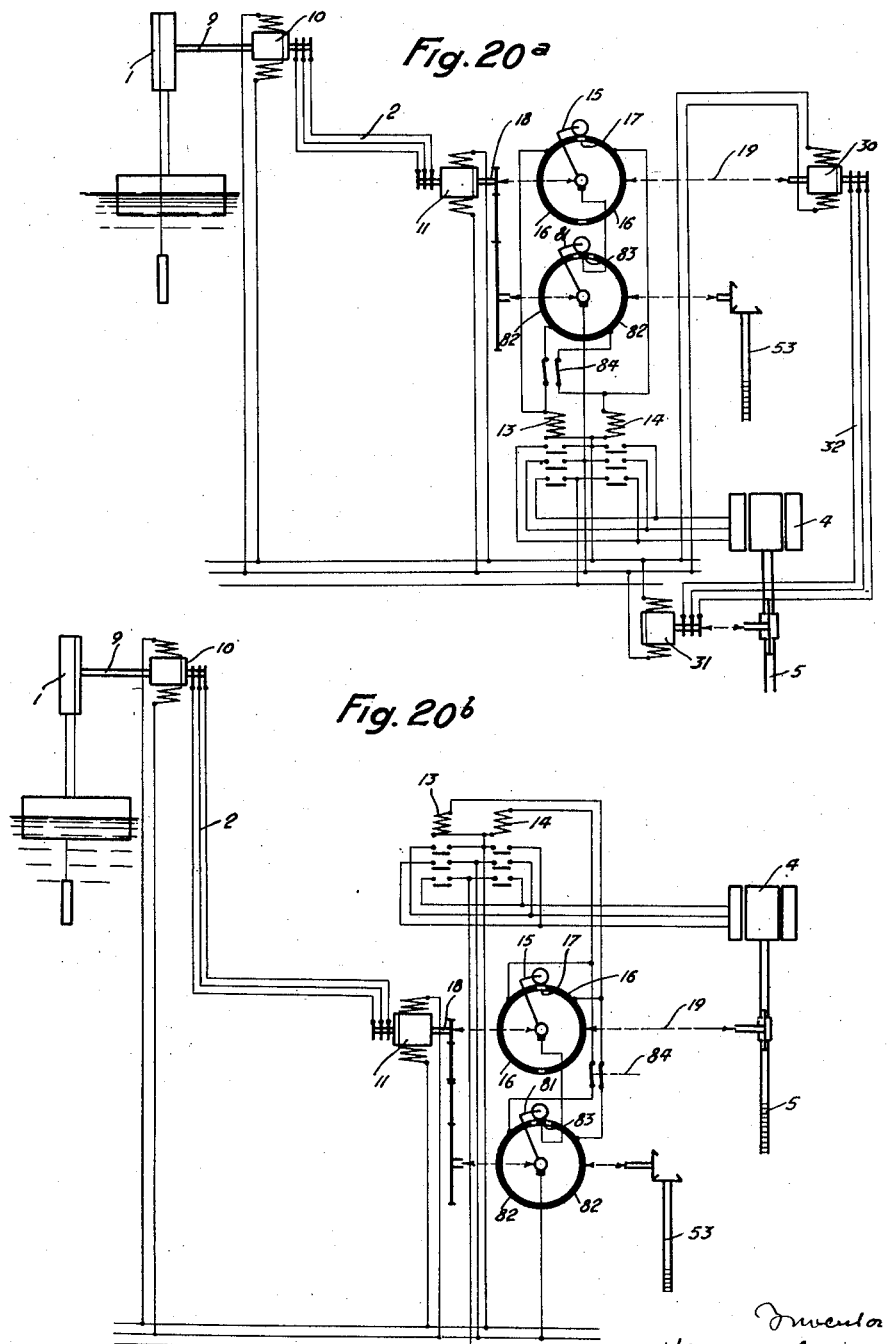

Jan. 12, 1954 V. GENINI ET AL 2,666,172
ELECTRIC MOTOR FOLLOW-UP SYSTEM FOR THE
ADJUSTMENT OF LIQUID LEVELS
Filed Aug. 6, 1947 9 Sheets-Sheet 9

Patented Jan. 12, 1954

2,666,172

UNITED STATES PATENT OFFICE 2,666,172

ELECTRIC MOTOR FOLLOW-UP SYSTEM FOR THE ADJUSTMENT OF LIQUID LEVELS

Victor Génini and Marcel Latapie, Paris, France, assignors to Etablissements St. Chamond-Granat, Paris, France, a company of France Application August 6, 1947, Serial No. 766,802
In France November 17, 1943

Section 1, Public Law 690, August 8, 1946
Patent expires November 17, 1963

10 Claims. (Cl. 318—31)

The present invention has in view a project for keeping a water-level at a fixed mark by the automatic adjustment of the water output either through the opening or raising of one or more sluice-gates, or through regulating the action of one or more hydraulic turbines.

It has in view, too, the application of a form of adjustment, similar to the above, for maintaining a water-level at a height that may vary from time to time in accordance with a fixed law.

It may be adapted especially for holding the level steady for storage basins for hydro-electric generating plants, as well as for the water-supply for the various works.

Taking a broader view, the invention takes in the adjustment of some factor that may be altogether different than the height of a water-level, for instance factors such as the position of moving parts of a machine, capacity, output, pressure, temperature, etc., by automatic action on one or more of the adjustment members of a variable on which a particular dimension or magnitude depends. In order to make things easier, however, the explanation of the invention will be restricted to a discussion on the subject of water-levels.

The method, that forms the object of the invention, includes mainly by the setting up of a close connection between neighbouring levels located on each side of the theoretical level to be maintained and stages of opening of the adjusting members, a connection that may be represented, as the case may be, by a law involving measurement in one dimension only or otherwise. For each figure of level included between the extreme ranges of adjustment, there is one position, and one only, of the adjusting member and for which the adjustment is steady.

The regulating device for putting into operation the above method is of special interest through the fact that it comprises a level-detector, preferably of the angular variation pattern, and an electrical form of transmission of the particulars, provided by the level detector, to an auxiliary motor coupled to an adjustment member for consumption, while the feeding of the motor is subject to the relative position of two members, between which comparison can be drawn, of which the positions are fixed, for one, by the level-detector through the agency of an electric transmission, for the other, by the position of the adjustment member through the agency of any suitable transmission, that may be mechanical or electrical.

In the general setup thus outlined, there are numerous modifications of the way in which it may be carried into effect. Thus, in the case of a linear law linking the changes in position of the adjustment member with those of the level, the level-detector and the electric transmission are among those able to convey to the comparing member that they control changes of position that vary linearly with alterations of level, and there are likewise movements of the second comparing member as a function of the movements of the adjustment member. In the case of non-linear law, the device mentioned above is finished off by a suitable translational means inserted in one of the transmissions between the comparing device, on the one hand, and the level-detector or adjustment member, on the other hand.

Electric transmissions employed are preferably transmissions of standard type by rotating-field mechanisms.

A worth-while improvement to the device mentioned above lies in the intervention of a differential in one of the transmissions connecting the comparing members to the level-detector and to the adjustment member, which allows a variation to be made in the level of the base-line of the adjustment; this arrangement is preferably finished off by equipment allowing the automatic adjustment to be put out of action momentarily, for instance by breaking the feed circuit of the motor actuating the adjustment member, at the moment when there is a change in the level of the adjusting base-line caused by the differential, and preferably automatically preparing this adjustment for coming again into play as soon as the new level, as decided, is reached.

For certain adaptations, and in accordance with another characteristic of the invention, the device comprises a differential inserted in one of the transmissions connecting the comparing members to the level-detector and to the adjustment member; this differential has one of its members controllable by a programmeter stopping automatically for predetermined levels. Preferably, another differential is inserted in the transmission connecting the programmeter to the first differential and one of its members may be worked by hand. Thus formed, this device allows a change to be made in the theoretical adjustment level in accordance with a given law as a function of time, and then allows it to be kept uniform at a given value. Such is the case, for instance, when a decision is made for the emptying and filling of a storage-basin or reservoir during fixed times.

Another important feature of the method mentioned above, forming, as it does, another characteristic of the invention, lies in its combination with the adjustment method based on a fixed level, the latter method only being brought into action much more slowly than the first one and as a function of the loss of head occasioned by the action of this first one in order to bring this loss of head step by step to zero through action on the main adjustment so as to alter the final statism.

The main adjustment thus allows a stable adjustment to be quickly formed, but at the cost of a certain loss of head, and the balancing adjustment that acts slowly brings the level to its fixed value without giving rise to any pumping.

To this end, the device forming the object of the invention comprises in combination with that previously described a balancing equipment made up of a differential inserted in one of the transmissions connecting the comparing members to the level-detector and to the adjustment member and actuated by an auxiliary electric motor having a control device for the feed which comprises two contacts working together of which one is normally stationary and the other connected, for instance, by electric transmission to the level-detector.

As examples that are in no way restrictive various arrangements of adjustment devices, in accordance with the invention, are shown diagrammatically in the accompanying drawings.

In these drawings:

Figs. 11 to 14 illustrate other modifications for putting into operation the method in accordance with the diagram of Fig. 1;

Figs. 15 to 17 show various modifications of devices provided with means that allow a variation to be made in the level of the adjusting base-line.

Fig. 19 is a sketch of the assembly of a device for putting into operation the method in accordance with the diagram of Fig. 18;

Fig. 20 shows in detail the electrical and mechanical equipment of the device of Fig. 19;

Figs. 20a and 20b are modifications of the equipment illustrated in Fig. 20;

Figure 1:
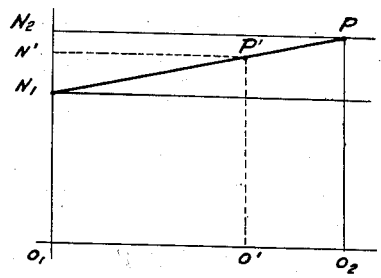
Fig. 1 is a diagram illustrative of the adjustment method that forms the object of the invention.

In Figs. 2 to 6 devices for adjustment of level have been illustrated arranged so as to adhere to the law of linear adjustment statism shown in Fig. 1 in which the levels are drawn as ordinates and the positions of the adjustment member as abscissae. This law has been reasoned deductively in allowing a maximum variation in level from N, to $N_2$, in recognising that the position O, of complete closure of the adjustment member corresponds to the lower level N, while the position $O_2$ of full opening corresponds to the upper level $N_2$, and finally that the movements of the adjustment member as a function of the level are proportional to the variations of this level. Thus is obtained the straight line N, P of linear adjustment. To every intermediate point P' of this straight line N, P there is a corresponding level N' and a position O' of the adjustment member that fulfill the condition mentioned above.

Figure 2:
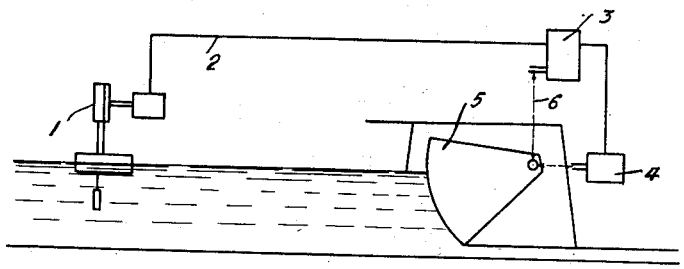
Figs. 2 to 4 are assembly sketches of modifications of devices for putting the method into operation in accordance with the diagram of Fig. 1.
Figure 3:
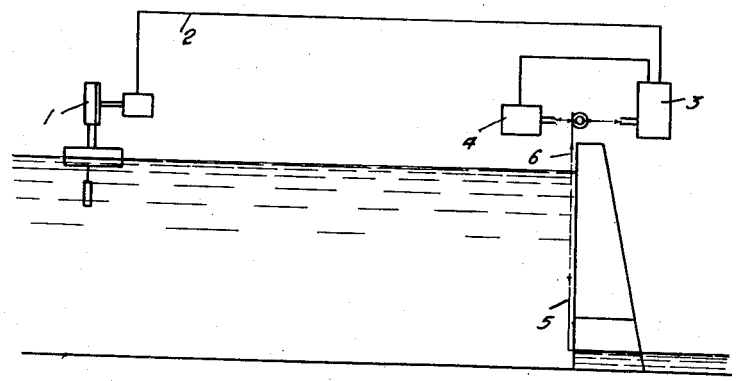
Figure 4:
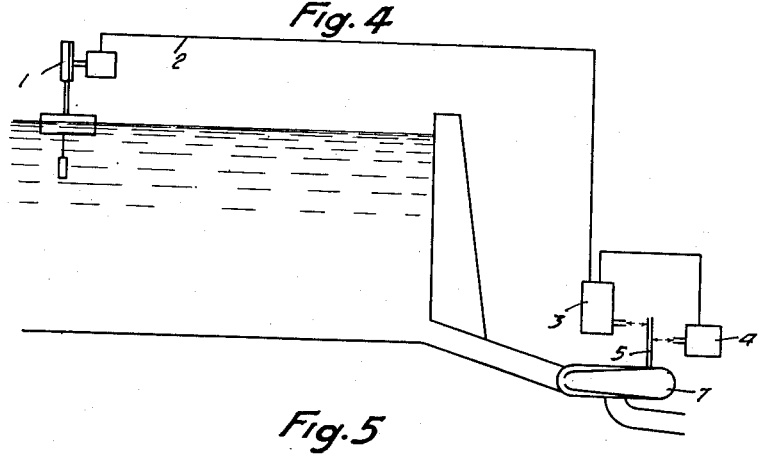
Figure 5:
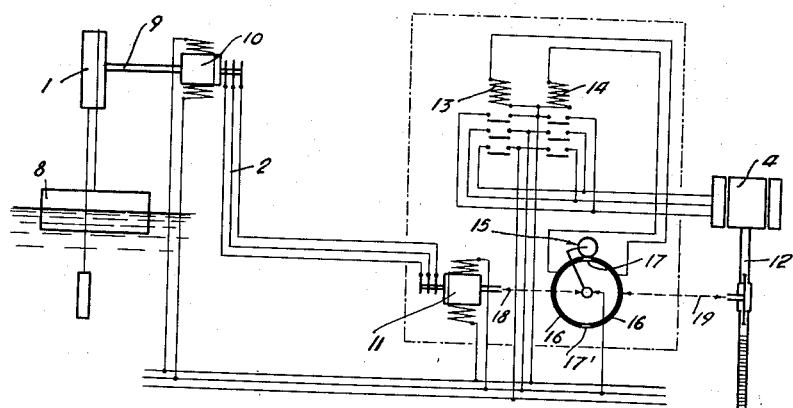
Figs. 5 and 6 show in detail two modifications of the electric and mechanical equipment of devices according to Figs. 2, 3 and 4.

The adjustment device arranged to fulfill this law comprises here a level-detector 1 and an electric transmission 2 of the signals of this detector 1 to a control device 3 of a two-way motor connected, so as to be able to actuate it, to the adjusting member 5 of the consumption, that is itself connected on the other hand through a transmission 6 to the control device 3. In Fig. 2, the adjustment member is a quadrant-type gate, in Fig. 3, it is a sluice-gate and, in Fig. 4, it is the gate of a turbine 7. In all these cases, the level-detector is standard equipment of the floater type 8 (Fig. 5) of which the displacements in height are converted to an angular displacement of a member 9. The latter drives the shaft of a transmitter 10, forming part of an electrical transmission through rotating field gear working either on direct current or alternating current (feed method only shown here); besides the transmitter 10, this transmission comprises a receiver 11 formed by another rotating-field mechanism. On the other hand, the motor 4, that works the adjustment member through the agency of the mechanical transmission 12, is fed by a control device comprising two contact-makers 13, 14, in parallel in the electrical network, but reverse connected on the motor and of which the windings are connected in parallel in the feed circuit with the intervention of a distributor made up of a rotating arm 15 that carries a contact roller running on a ring showing two semi-circular areas 16 separated from each other by two insulating areas 17 and 17' of which one, 17, is narrow and use is made of it in the working system. The areas 16 are connected respectively to the windings of the contact-makers 13, 14. The control arm 15 and the control ring are connected respectively to receiver 11 and to transmission 12 through transmissions 18, 19 in reference to constant transmission.

The system works as follows:

On stopping, the contact roller of arm 15 is on the insulating area 17. If a variation of level occurs, the member 9 has an angular movement through an amount proportional to this variation and, through the agency of transmitter 10 and receiver 11, imparts to arm 15 an angular movement in proportion to its own. One of the electro-contact makers 13—14 is thus excited, with its circuit closed by the contact roller coming on one of the conducting areas 16, and closes, thus feeding the motor 4 that then works the adjustment member; but at the same time the transmission 19 causes the control ring to rotate and the latter follows the movement of arm 15 up till the moment, when the latter being stopped, the rotation of the ring brings the insulating area 17 in contact with the roller, which cuts the feeding of motor 4; the latter stops and at this very instant the adjustment member is in the position fixed by the law of Fig. 1.

In the example outlined above, the electric transmission 10, 11 is of the continuous displacement type so that every variation of level involves a movement of the adjustment member.

Figure 6:
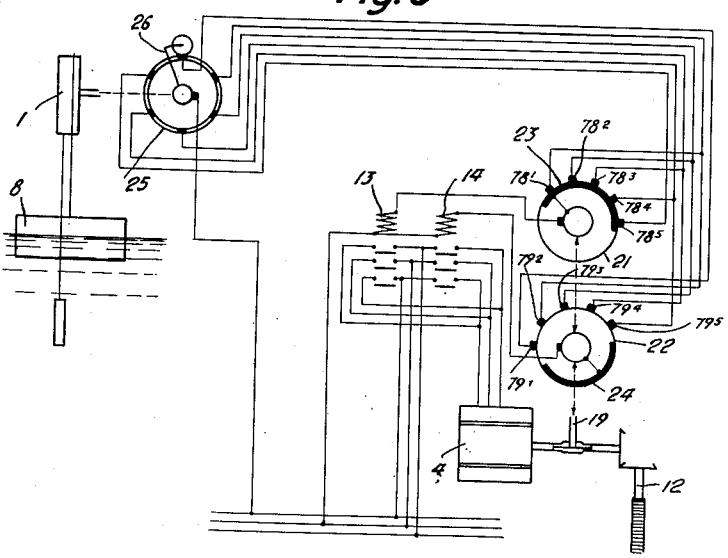

In the layout illustrated in Fig. 6, on the other hand, the control device is formed by an intermittent transmission of standard pattern that allows the adjustment member to occupy a restricted number of positions corresponding to the same number of level equivalents.

This device comprises a transmitting distributor 25 having a plug 26 which is moved by the level-detector.

This distributor feeds in parallel the fixed studs 18 and 19 of two distributors 21 and 22 of which the movements are interdependent and that are controlled by the shaft 19 actuated by the adjustment member. The rotating part of distributors 21 and 22 comprises a moving sector 23 and 24 allowing the feeding of studs 18 and 19.

The distributor 21 induces the running of motor 4 in one direction and distributor 22 causes the motor to run in the other direction.

When the roller 26 comes in contact with one of the fixed studs of the distributor 25, it feeds the fixed studs 18 and 19 so that, according to the respective positions of the roller 26 and rotary distributors 21 and 22, the studs 18 and 19 come in contact with the conducting sectors 23 and 24, which causes the starting of motor 4 through the agency of relays 13 and 14.

When the motor 4 has travelled through the angle corresponding to the movement of the roller 26, the circuit closed by this roller is again opened, with the conducting sectors 23 and 24 occupying at this instant a position similar to that of Fig. 6. The relays 13 and 14 drop causing the stoppage of motor 4.

It must be observed that the number of positions, in the case of the example selected, is restricted to the number of fixed studs on the distributors.

Under the conditions when the number of positions to be maintained is more extensive, use may be made of a standard arrangement based on what has gone before and comprising a transmission with several stages.

In this case the rotary speeds of the introduction transmissions of each stage are geared down in relation to each other, with the transmissions of the faster stages acting as a vernier or sliding-gauge in relation to the slower speeds. This arrangement allows, by calling $p$ the number of studs of each introduction transmission and $n$ the number of the latter, to ensure a number of positions $Pn$, the number of conductors being only $(P \times n) + 1$.

Figure 8:
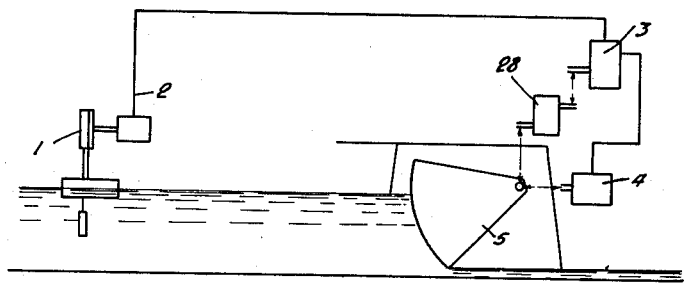
Fig. 8 shows, like Figs. 2 to 4, the assembly of a device for putting into operation the method in accordance with Fig. 7.

Instead of a law of linear adjustment such as illustrated in Fig. 1, there may be preference for a law adjustment illustrated by a cure C (Fig. 7) going through the clearly defined end points N₁ and P as explained above with reference to Fig. 1. To effect this law, a translational means 28 (Fig. 8) is placed between the adjustment member 5 and the control device 3.

Figure 7:
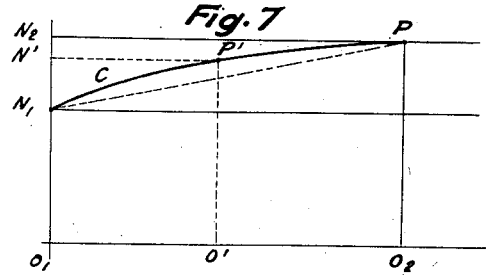
Fig. 7 is a similar sort of diagram to that of Fig. 1 and illustrates a modification of this method.

This translational means may be, for instance, of a standard type formed by a balance-beam and cams with suitably designed contour to effect a law of variation as illustrated by the curve C of Fig. 7.

Figure 9:
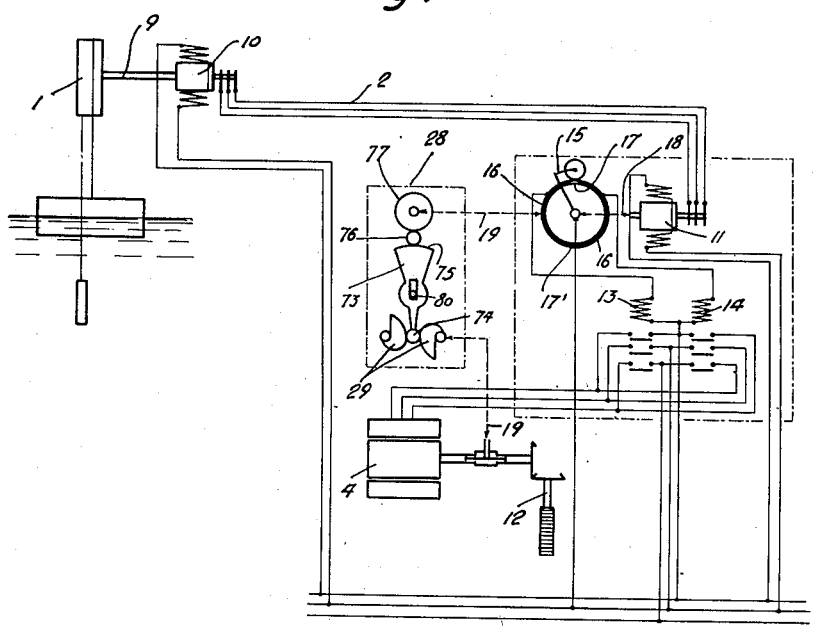
Figs. 9 and 10 illustrate in detail two modifications of the electric and mechanical equipment of the device in accordance with Fig. 8.

This type of translational means shown very diagrammatically in Fig. 9 comprises a balance-beam 73 that can swing around an axis 80. The lower part of the beam comprises a roller 74 running between two control cams 29 of suitable shape to effect the translational law to be adhered to.

The balance-beam transmits the "translated" angles to the shaft 19' driving the control device, by means of a toothed sector 75 located at its upper part actuating pinions 76 and 77.

In accordance with the standard arrangement this type of translational means allows the fulfilment of various laws of variation, on the one hand through suitable shaping of cams 29, and on the other hand by displacement of the axis of rotation 80 in relation to balance-beam 73.

Figure 10:
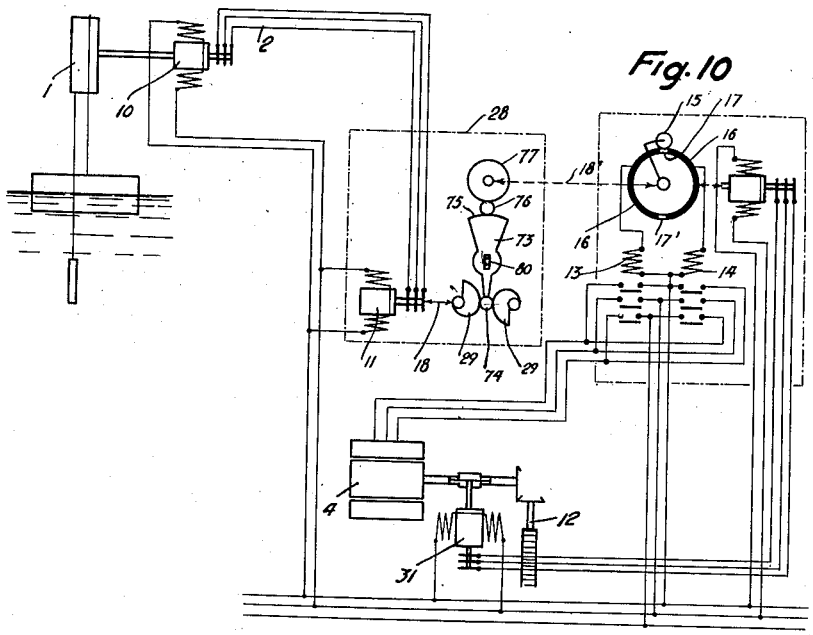
Figure 12:
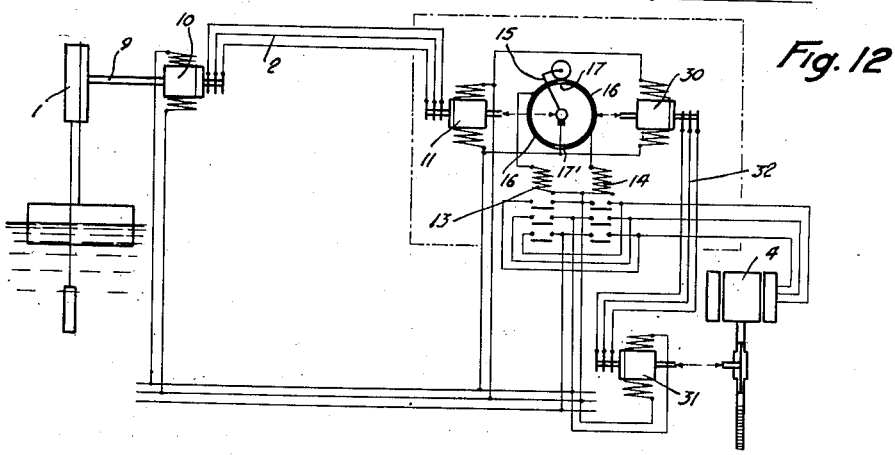
Figure 11:
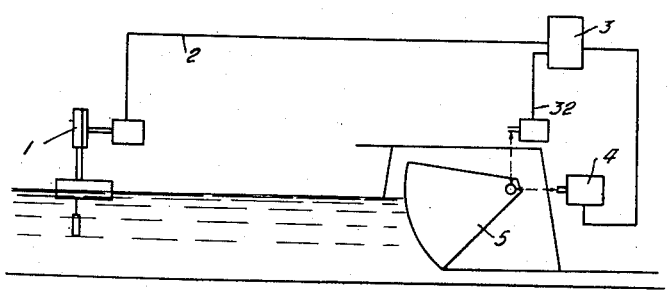

The device illustrated in Fig. 10 varies from that shown in Fig. 9 by the fact that the translational means 28 is inserted in the mechanical transmission 18 connecting to the control device 15, 16 the receiver 11 of the electrical transmission coming from the level-detector 1. Another difference lies in the fact that the control device 15, 16 instead of being connected through a mechanical transmission to the adjustment member is connected through the agency of an electrical transmission with a rotating field mechanism, comprising a receiver 30 driving the arm 15 of the control device and a transmitter 31 connected to the mechanical transmission 12 between motor 4 and the adjustment member. This modification of linkup between the control device and the adjustment member may also be employed in the case of devices illustrated in Figs. 5, 6 and 9, as shown in Figs. 11 to 14 by several examples. In Fig. 11, in other respects similar to Fig. 2, may be seen at 32 the electric transmission placed between the adjustment member 5, in the shape of a quadrant gate, and the control device 3. Fig. 12 shows in greater detail this transmission in the case of an installation similar in other respects to that illustrated in Fig. 5: the transmission by a rotating field mechanism comprises a transmitter 31 mechanically connected to the adjustment member 5 and a receiver 30 driving mechanically the control rings 16. The arrangement illustrated in Fig. 13 is only a modification of the previous one since the electrical transmissions, formed by the transmitter 10 and receiver 11 and transmitter 30 and receiver 31 coming respectively from the level-detector 1 and the adjustment member, no longer actuate directly the control device 15, 16 but operate the primary 34 and secondary 35 of a differential the planet-gear carrier 36 of which is connected mechanically to the moving roller-carrying arm 15 of the control device of which the ring 16 is then fixed. A variation in the level causes the primary 34 to rotate and initiates a displacement of the planet-gear carrier 36 and of the arm 15 thus starting up the motor 4; the resulting displacement of the adjustment member causes the secondary 35 to rotate in a reverse direction and thus brings back the planet-gear carrier 36 and arm 15 to the starting position. Instead of the two receivers 11 and 30 and the mechanical differential 34, 35, 36, application may be made of the differential receiver 37 connected to the two transmitters 10 and 31 and of the roller-carrying arm 15, as shown in Fig. 14 that is in other respects identical with Fig. 13.

In the arrangement illustrated in Fig. 15 a differential 39, 40, 41 is interposed in the transmission between the adjustment member 5 and the control device 16; the planet-gear carrier of this differential may be moved by hand by turning the hand-wheel 42. This action allows an alteration in the setting of the control rings 16 in relation to the adjustment member 5, which has the effect of actuating the device so as to bring the adjustment member 5 into a new position fixed by this offset, thus setting up a new relationship between the levels and the positions of the adjustment member.

In other respects, the control device undergoes the following change: A stud 46 is arranged on the control rings in the space occupied by the stud at its dead point 17; it is connected to an electro-contact maker 44 that, on the one hand, controls the feeding of contact-makers 13 and 14 and, on the other hand, is connected in the network by a main 47 including a push-button switch 48. This switch is closed normally and the working procedure is as follows: Through the opening of the push-button 48 automatic working is held up; the electric contact-maker 44 is no longer excited, cuts the exciter circuit 43 of contact-makers 13 and 14 that are thus locked and cut permanently the feeding of the motor 4; the automatic working of the device is consequently held up.

In order to alter the reference level of the adjustment the control rings 16 are offset by means of the hand-wheel 42; the roller of arm 15 is in contact with one of the rings 16 but the contact-makers 13 and 14 cannot be excited, the coil circuit being cut through a contact of the relay 44 and the setup consequently remains in the inoperative position. When the position of the adjustment member (located in any way, for instance, by hand) corresponds to the reference level, the roller of arm 15 is on the stud 46; through the main 45 the circuit of the contact-maker 44 is closed. The electric contact-makers 13 and 14 are released and allow the automatic working of the setup that acts as in previous setups; on the other hand the relay 44 is kept self-excited by conductor 47 up to the opening of the switch 48 and this is the case in spite of the separation of the contact roller of arm 15 and the stud 46.

Figure 16:
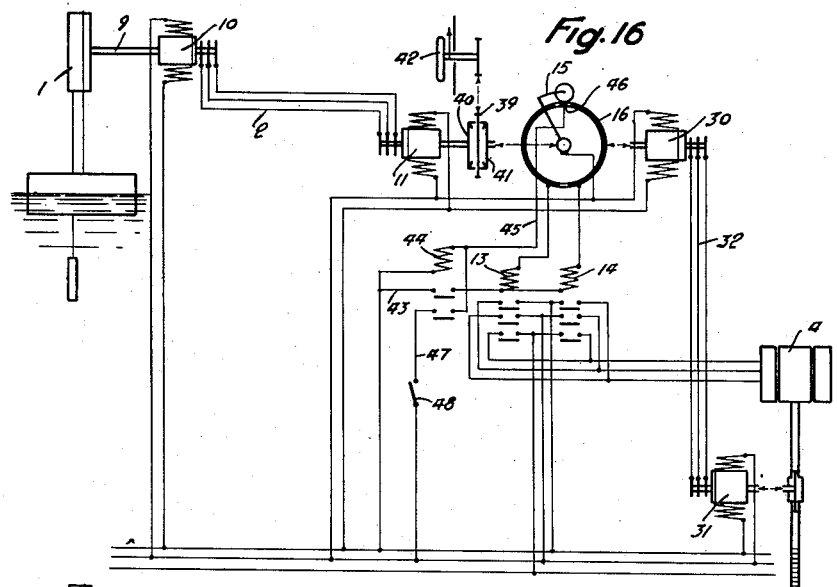

The device illustrated in Fig. 16 varies from the previous one by the fact that, on the one hand, the differential 39, 40, 41 for the control of adjustment of level is inserted between the receiver 11 of the electric transmission coming from the level-detector 1 and the control arm instead of being placed between the adjustment member 5 and the control device and that, in other respects, the arrangement comprises an electric transmission between the adjustment member 5 and the control device as illustrated in Fig. 12.

Figure 17:
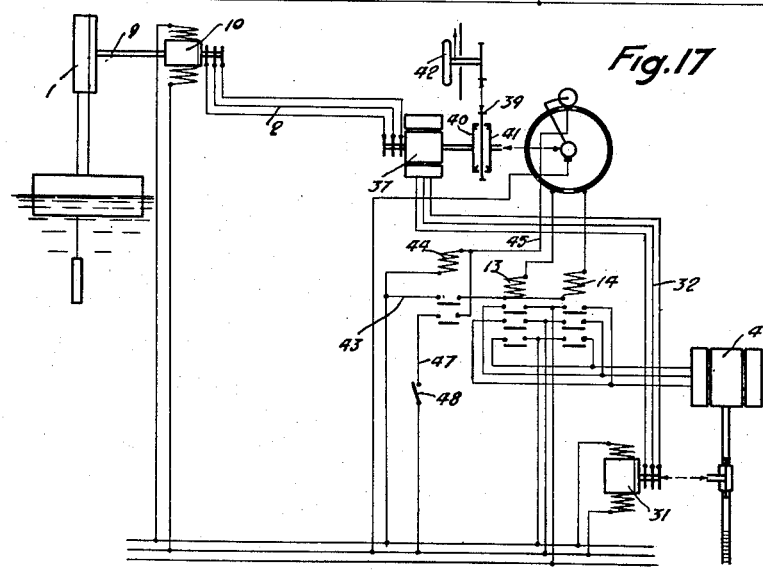

In the same way the layout illustrated in Fig. 17 shows the application of this same control device for adjustment of level to the adjustment device as shown in Fig. 14.

Figure 18:
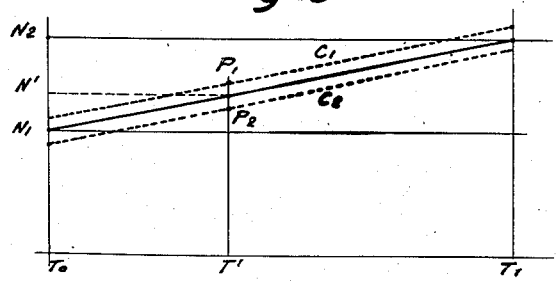
Fig. 18 is a diagram illustrating the adaptation of the adjustment method to the case of variation of the level of the adjusting base-line in accordance with a law given as a function of time.

Fig. 18 illustrates the adjustment of a level varying between two ranges $N^1$ and $N^2$ during a given time interval $T^0T^1$ and in such a way that at moment $T'$ the theoretical level is $N'$. This is the case shown when it is desired to vary the theoretical level according to a law given as a function of time, then to hold it constant at a given value, for instance, when it is a question of emptying and filling a reservoir during fixed periods.

With the adjustment carried out for a given condition, the level at time $T'$ will be included between values $P^1$ and $P^2$, level limits that are located on the envelope curves $C^1$ and $C^2$ and that correspond respectively with full opening and full closure of the adjustment member.

The assembly of the device illustrated in Fig. 19 comprises then a programmeter 51 in addition to the component units of the adjustment device with possible variations in the base-line level of the adjustment. In the setup of such an arrangement as illustrated in Fig. 20, the adjustment device is of the pattern shown in Fig. 12 and, as explained in reference to Fig. 15, there is, between the receiver 30 of the position of the adjustment member and the control rings 16, a differential 39, 40, 41 that allows a variation to be made in the base-line level of the adjustment. In this case, it is the planet-gear carrier 39 of this differential that is driven through the receiver 30 and the sun-and-planet gear 41 that is connected to the control rings 16. The other sun-and-planet gear 40 is driven by a control shaft 53 that is itself connected to the programmeter made up of a speed-changer 57 that drives this shaft and that is actuated by an electric motor 58 fed through a current reverser 59 and a contact-maker 60 with closure controlled by push-button 61 and with opening controlled by contacts 62, 63 working with a movable cleat 64 driven by shaft 53. A differential 54, 55, 56 is arranged between the control shaft 53 and the programmeter. The planet-gear carrier 55 of this differential 54 to 56 is workable by a hand-wheel 65.

By pressing on the push-button 61, the motor 58 is started up in a direction fixed by the reverser 59 and the shaft 53 is driven at a speed regulated by the speed-changer 57. The differential 39 and 41 then causes a progressive variation in the setting of the control rings 16 in relation to the receiver 30 of the position of the adjustment member, which causes a variation in the base-line level of the adjustment as explained above in reference to Fig. 15. When the setting of the ring 16 corresponds to the desired base-line level, the movable cleat 64 that moves progressively along the shaft 53 meets and opens one of the contacts 62, 63, thus stopping the working of the programmeter. The device consequently acts so as to hold fixed the new base-line level.

The working of the hand-wheel 65 allows the location of the fixed reference level for adjustment to the initial time point. In other words, by referring to Fig. 18, it allows the positioning of level $N^1$ at time $T^0$.

It allows, moreover, if running without a programmeter is contemplated, the actuation of the control shaft 53 so that any value for the adjustment may be selected.

The programmeter, of course, may be combined with any one of the devices previously described. In the same way, the device may include a translational means between receiver 11 and arm 15 if the law of relationship between the level and the positions of the adjustment member is otherwise than linear; a translational means may also be inserted between the speed-changer 57 and shaft 53 if the law of variation of level has not to be formerly linear. In the case where a programmeter is combined with the devices illustrated in Figs. 13 and 14, the control rings 16 that were fixed in these devices become movable and are driven by the control shaft 53.

In the case where the change possible in the base-line level of adjustment may be quite considerable with reference to the alteration of level, the equipment, illustrated in Fig. 20 and consisting in offsetting the rings 16 in relation to the receiver 30 in order to vary the base-line adjustment, may be completed by an auxiliary ring device with a movable roller allowing an increased accuracy of adjustment.

Such a device has been illustrated in Fig. 20a. The receiver 11 controls, on the one hand the roller-carrying arm 15 moving on the rings 16 as in Fig. 20; moreover, it drives, by means of suitable reducing-gear, the roller-carrying arm 81 of the auxiliary device of which mention has been made above and that is formed by two half-rings 82 similar to rings 16. However, these rings 82 comprise in the circuit-breaking area an additional conductor stud 83 allowing the feeding of the roller-carrying arm 15 by the roller-carrier 81.

The rings 16 are actuated by the receiver of position 30 of the adjustment member 5 and the rings 82 by control shaft 53.

The operation is as follows:

The control shaft 53 causes the offsetting of rings 82 and the roller of the arm 81 thus comes in contact with one of the half-rings 82, the effect of which is to start up, through one of the contact-makers 13 or 14, the motor 4 for driving the adjustment member.

The level varies in the direction prescribed by the adjustment member until it reaches the predetermined zone. The roller 81 then leaves the half-ring 82 with which it was in contact and feeds the stud 83 connected to the arm 15. The rings 16 then ensure the normal operation of the setup, as in the case of Fig. 20.

Just as in the device of Fig. 15, automatic operation may be held up as long as the predetermined zone is not entered. To this end, a switch 84 is placed between rings 82 and contact-makers 13 and 14 locking any action of the device on the motor 4.

With transmission 2 revolving a certain number of times for the total amplitude of the variation of level, a device may be inserted in the driving shaft 9 of transmitter 10 with the effect of ensuring the automatic resetting of the transmission when, owing to a current breakdown for instance, the level may have changed in value without any indication of this change on the part of the transmission.

This device may be formed by an automatic disengaging system controlled by a low voltage relay. The transmitter 10, on this account, remains stationary in the case of a current breakdown. In order to ensure the tuning-in of transmitter 10 and winding-drum 1, at the time of putting back the gear under voltage, there may be associated between the winding-drum 1 and transmitter 10, besides the disengaging indicated above, a device for comparison of position similar to the half-rings 16 in which, for instance, the roller might be controlled by the winding-drum 1 and the rings connected to motor 10. This comparison device would control an auxiliary readjusting motor bringing the transmitter 10 in tune with winding-drum 1; at this moment the comparison device will have its roller on the switch-off.

A further device may be also provided so as to insulate this auxiliary readjusting motor from its linkup with the transmitter 10 when the gear is under voltage.

In order to ease the drawbacks of lack of voltage for the case where the transmission 2 carries out several turns, a blocking of current may be arranged also on the winding-drum ensuring that the winding-drum is stationary as soon as there is lack of voltage.

This arrangement requires the provision of a special style of float. While the latter remains stationary as a consequence of the blocking of the drum, it is necessary in fact that the level may alter and specially rise, without any tendency on the part of the float to follow the movement for this purpose, the float is ballasted in such a way that the Archimedean pressure is less than the weight of the float. On account of the blocking of the drum, with the counterweight not having any effect, the float may thus be submerged. In the case of a falling level, the float stays hanging to its rope. When the feeding current is on again, the current is unblocked in the drum and the float resumes its previous balanced position. To prevent the device, formed by the drum-float and counterweight assembly, from accelerating too rapidly, especially if it is a question of large changes in level, a dash-pot or equivalent form of mechanism may be arranged and controlled by shaft 9 and restricting at one and the same time the speed and degree of acceleration of the assembly.

Fig. 20b is a modification of the previous arrangement in which the position of the adjustment member is no longer conveyed by an electrical linkup but transferred directly by shaft 19 as in Fig. 15.

Figs. 20a and 20b may be carried out in modified form by means of electric transmission of standard multi-circuit type, with the slower circuit (preliminary operation) controlling the assembly 81—82 and the faster circuit (fuller accuracy) the assembly 15—16.

According to the accuracy demanded and the degree of variations of the base-line level, the outfit might comprise any number of stages and especially over the number 2 that has been selected as an example in Figs. 20a and 20b.

Figure 21:
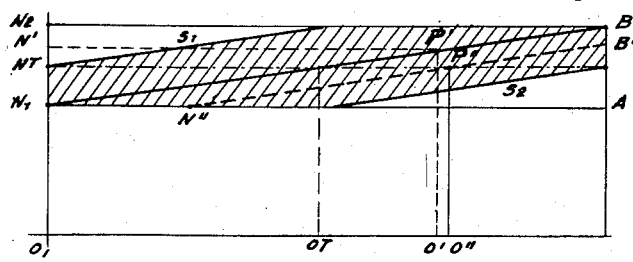
Fig. 21 is a diagram illustrating the method in accordance with the diagram of Fig. 1 in combination with a method for adjustment at constant level.

The method of adjustment illustrated in Fig. 21 comprises a dual form of adjustment that has the tendency to hold steady a theoretical level NT when in previous methods this level was maintained with a margin.

To this end, a primary device is provided to cause, at the time of the raising of level from NT to N', for instance, the opening of the adjustment member from OT to O' (curve N¹, B); to this adjustment is added a further extra form of adjustment for the constant level that, through slow displacement of the adjustment member, slowly brings the level of N' (functioning point P') to NT (functioning point P'' of a curve N''B'), which corresponds to an opening O'' of the adjustment member.

It will be observed that if there is a change again in level, the opening of the adjustment member will be determined by the curve N''B' and that the different statism curves are included between the two outside ranges of curves S¹ and S².

Figure 22:
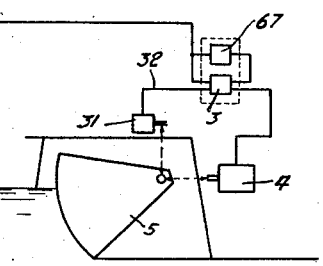
Fig. 22 shows the assembly of a device of the method in accordance with Fig. 21.

Fig. 22 illustrates the addition of such a further adjustment device 67 to an adjustment device of one of the types described previously, of the pattern of that in Fig. 11.

Figure 23:
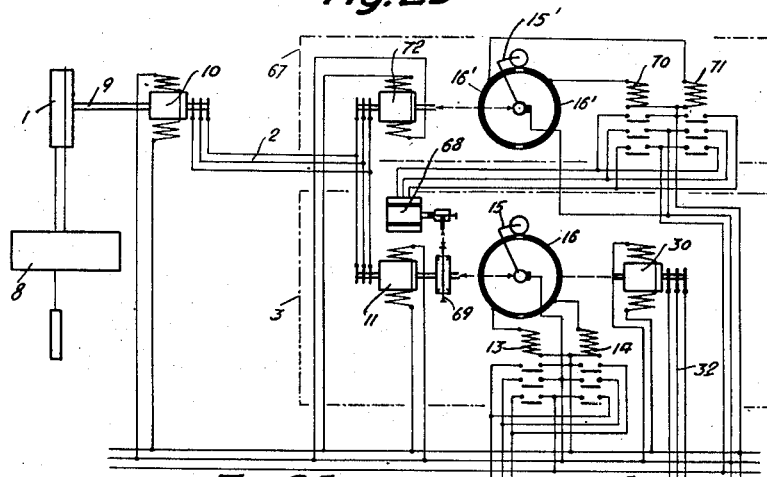
Fig. 23 shows in detail the electrical and mechanical equipment of the device of Fig. 21.

In the example of execution described in Fig. 23, this further adjustment device comprises an auxiliary electric motor unit of which the motor 68 drives, through the agency of a suitable reducing gear, the planet-gear carrier of a differential 69, for variation of the base-line level of adjustment, placed between the receiver 11 of the level and the roller of arm 15. The control device of this motor 68 comprises two contact-makers 70—71 for reversing current in the motor, connected respectively to two conducting areas 16' of a stationary control ring working with a contact roller carried by a rotating arm 15 15' connected to an electric receiver of position 72, feed by the level-transmitter 10. Possibly, the receiver 72 might merge with receiver 11 that would actuate the control arm 15'. It is evident that any variation of level that brings into plate the main device for adjustment is also transmitted to the control arm 15' which provides the starting-up of the motor 68 and, consequently, through the agency of a suitable reduction mechanism and of the differential 69, a slow offsetting of the control arm 15 in relation to the receiver of position 11 until the arm 15 has been brought, through the variations of the base-line level of the main adjustment resulting therefrom, to its original position corresponding to the constant level NT to be kept.

The device may comprise, moreover, a means, that may be electric or mechanical, for causing a variation in the speed of the motor 68 as a function of the extent of the initial off-setting recorded by the outfit.

The ring 16' may also be arranged at the transmitting station and also the control arm 15' of the further adjustment device and the arm 15' may then be driven directly by shaft 9 of the floater drum 8.

The device may comprise also any suitable translational means for setting up a special law of relationship between the variations of level and the positions of the adjustment member.

It may be noted that the area 17 allows regulation of the extent of the insensitiveness of the system around a given level.

This adjustment may be of interest in the majority of cases in order to avoid a continuous functioning of the layout. By acting on the width of area 17, it thus becomes possible to restrict the number of times that the adjustment member starts up during a given period, while preserving for the layout at one and the same time its extreme adjustment ranges.

Figure 25:
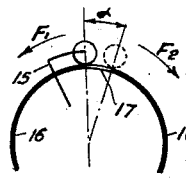
Fig. 25 illustrates a device for putting the method into operation in accordance with Fig. 24.

The diagram of Fig. 1 corresponded to the ideal case of an area of extremely narrow width. When the width of the area increases, the working diagram is shown as indicated in Fig. 24, while Fig. 25 illustrates the respective positions of the roller and the switch-off 17.

Figure 24:
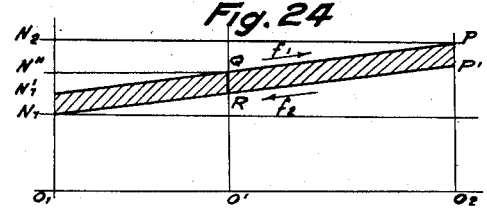
Fig. 24 is a diagram illustrating a modification of the adjustment method, a modification that comprises an adjustment fork conducing to the maintenance of the equipment at the time of changes of direction of the variation of level.

In Fig. 24, the variations in level are provided between end limits $N^1$ and $N^2$, the insensitiveness of the system expressed as a height of the level being equal to the distance $N^1N'^1$.

This insensitiveness of adjustment is determined by the extent of the insulating area 17 (Fig. 25) separating the rings 16 of the control device. The importance of this area is such that the angular travel of the roller of arm 15 corresponds to the distance between the levels $N^1N'^1$.

If the parallelogram is regarded as bounded by the two parallels $N'^1P$ and $N^1P$ on the other hand, and the ordinates $O^1$ and $O^2$ on the other hand, the continuous increments of level will be effected on the straight line N', P in the direction of arrow F, while continuous falls in level will be effected on the curve $P'$ $N^1$ in the direction of arrow $F^2$. Apart from the continuous falls and continuous rises, every movement of level is conveyed by a displacement of the roller of arm 15 on the area 17 that has no influence on the adjustment member.

Under these conditions the position of this member remains unaltered during all the travel of the roller of arm 15 along the area 17. In practice, if we assume that the level increases and goes in a continuous way from $N'^1$ to $N''$ the adjustment member takes a position O' while the roller is in the position of Fig. 25 (full line). At this moment, if the level falls the roller moves according to arrow $F^2$ and comes in contact with the area 17. As pointed out above the adjustment gear is not actuated and the result of this is that the level may fall from Q to R without any reaction from the gear; the adjustment member is held in the position O'.

If at this moment the level rises, the roller travels over the area 17 in the direction of arrow F, without any resulting movement of the adjustment member. Consequently for all the positions of the adjustment member, whatever they may be, (for instance for the position O') it is possible to vary the level from R to Q and from Q to R without bringing into action the adjustment gear.

Naturally, in the previous assumption, when the level, after having fallen from Q to R keeps on falling, it then moves on the straight line RN, in the direction of arrow $F^2$.

This method of adjustment may be added, of course, to any one of the devices illustrated in the previous figures.

As will be naturally understood the invention is in no way restricted to the disclosed forms of execution that have been submitted only as examples.

What we claim is:

1. In an electric control system, a movable member of varying position, a follow-up device comprising a followed movable member and a follower, an electric transmission form said movable member to said followed member and whereby the latter is given a position depending upon that of said movable member, a regulating member, an electric motor adapted to actuate the latter, an electric circuit adapted to feed said motor and controlled by said follow-up device so as to be open for at least one predetermined relative position of the followed member and of the follower, motion transmitting means from said motor to said follower, and adjusting means arranged to interfere with at least one of the operative connections of said follow-up device with said movable member and regulating member, respectively, whereby to vary the position of said regulating member for at least one end position of said movable member and consequently the control action of the system.

2. In an electric control system, as in claim 1, said adjusting means comprising a differential gear.

3. In an electric control system as in claim 1, switch means included in said motor feeding circuit and operable at will momentarily to put the electric control system out of operation.

4. In an electric control system as in claim 3, means providing for self re-starting of the control system upon said movable member coming to a predetermined position, whereby to constrain the control system to be operative for a range of positions of said movable member on one side of said predetermined position despite said switch.

5. In an electric control system as in claim 2, a programmeter drivingly connected to one member of said differential gear and adapted to automatically stop for predetermined positions of said movable member.

6. In an electric control system as in claim 5, a second differential gear forming part of the driving connection between the programmeter and the first differential and means whereby one of the gear wheels of said second differential may be actuated at will.

7. In an electric control system as in claim 2 means adapted to be responsive to the cause of the actual positions of the movable member and capable of operating one of the gear wheels of said differential.

8. In an electric control system as in claim 1, means responsive to operation of said adjusting means and adapted to hold said follow-up device in inoperative condition upon actuation of said adjusting means and during operation thereof.

9. In an electric control system as in claim 1, said adjusting means being actuatable by hand.

10. In an electric control system as in claim 1, said adjusting means being designed to vary by the same spatial amount two end positions of the movable member.

VICTOR GÉNINI.
MARCEL LATAPIE.

References Cited in the file of this patent

UNITED STATES PATENTS

| Number | Name | Date |
| --- | --- | --- |
| 935,327 | Routin | Sept. 28, 1909 |
| 1,388,632 | Dean | Aug. 23, 1921 |
| 1,582,715 | Wensley | Apr. 27, 1926 |
| 1,832,809 | Hudson | Nov. 17, 1931 |
| 1,954,142 | Moffett | Apr. 12, 1934 |
| 2,090,812 | Schmitt | Aug. 24, 1937 |
| 2,119,061 | Stein | May 31, 1938 |
| 2,139,482 | Atz | Dec. 6, 1938 |
| 2,420,523 | Davis et al. | May 13, 1947 |